UNITED STATES PATENT OFFICE.

GEORGE W. MAGUIRE, OF CONFLUENCE, PA., ASSIGNOR TO ANTONY DEGLER, H. L. HARBISON, AND GOTLIEB RICHARD, OF SAME PLACE.

IMPROVEMENT IN LUBRICATING COMPOUNDS.

Specification forming part of Letters Patent No. 211,755, dated January 28, 1879; application filed November 22, 1878.

*To all whom it may concern:*

Be it known that I, GEORGE W. MAGUIRE, of Confluence, in the county of Somerset and State of Pennsylvania, have invented certain new and useful Improvements in Lubricating Compounds; and I do hereby declare the following to be a full, clear, and exact description of the invention, such as will enable others skilled in the art to which it pertains to make and use it.

My invention relates to an improvement in lubricating compounds; and it consists in the preparation of a compound that resists the effects of heat when applied to the hot ends of rolls for making sheet-iron.

The lubricating compounds now in general use, when applied to the hot ends of rolls, have the defect of running off and spreading over the rolls, where the oily substance comes in contact with the sheets of iron, causing their edges to crack and become ragged.

My improvement, while it lubricates as well as any of the known compounds for the same purpose, has the advantage of remaining where it is applied, whether the rolls be hot or cold.

To obtain one hundred pounds I use sixty pounds of fish, sixteen pounds of tallow, twelve pounds of soap-stone, nine pounds of plumbago, two pounds of saltpeter, and one pound of lime.

To make this lubricating compound, the fish (including every part of it) is first subjected to a steaming process, then macerated and passed through strainers, when it assumes the form and condition of a thick jelly. The tallow is melted in a separate vessel, and the other ingredients mixed and thoroughly incorporated with it, forming a thick paste. To this paste the fish-jelly is added while warm, and the whole mass stirred until all parts of it are thoroughly mixed and combined and assume the appearance of a smooth paste, which, after cooling, possesses the necessary consistency to be readily applied for the purpose heretofore mentioned.

Having thus described my invention, I claim—

A lubricating compound consisting of prepared fish, tallow, soap-stone, plumbago, saltpeter, and lime, mixed in or about the proportions and prepared substantially as described.

In testimony that I claim the foregoing I have hereunto set my hand this 20th day of November, 1878.

GEORGE W. MAGUIRE.

Witnesses:
T. F. LEHMANN,
A. DEGLER.